United States Patent
Pan

(10) Patent No.: US 11,273,496 B2
(45) Date of Patent: Mar. 15, 2022

(54) SYSTEM AND METHOD FOR ROTATIONAL 3D PRINTING

(71) Applicant: Nick Pan, Erwinna, PA (US)

(72) Inventor: Nick Pan, Erwinna, PA (US)

(73) Assignee: PANAM 3D LLC, Erwinna, PA (US)

( * ) Notice: Subject to any disclaimer, the term of this patent is extended or adjusted under 35 U.S.C. 154(b) by 379 days.

(21) Appl. No.: 15/954,062

(22) Filed: Apr. 16, 2018

(65) Prior Publication Data

US 2019/0314894 A1  Oct. 17, 2019

(51) Int. Cl.
| | |
|---|---|
| *B22F 12/00* | (2021.01) |
| *B29C 64/153* | (2017.01) |
| *B29C 64/245* | (2017.01) |
| *B29C 64/295* | (2017.01) |
| *B29C 64/255* | (2017.01) |
| *B28B 1/00* | (2006.01) |
| *B33Y 30/00* | (2015.01) |
| *C03B 19/01* | (2006.01) |

(Continued)

(52) U.S. Cl.
CPC .............. *B22F 12/00* (2021.01); *B23K 26/34* (2013.01); *B23K 26/354* (2015.10); *B28B 1/001* (2013.01); *B29C 64/153* (2017.08); *B29C 64/245* (2017.08); *B29C 64/255* (2017.08); *B29C 64/295* (2017.08); *B33Y 30/00* (2014.12); *C03B 19/01* (2013.01); *B22F 10/10* (2021.01)

(58) Field of Classification Search
CPC ........................... B29C 64/153; B29C 64/241
See application file for complete search history.

(56) References Cited

U.S. PATENT DOCUMENTS

| | | | |
|---|---|---|---|
| 4,794,222 A | * 12/1988 | Funayama | ........... B23K 26/048 |
| | | | 219/121.74 |
| 5,304,329 A | 4/1994 | Dickens et al. | |

(Continued)

FOREIGN PATENT DOCUMENTS

| | | | |
|---|---|---|---|
| DE | 102013210242 A1 | * 12/2014 | ........... B29C 64/153 |
| DE | 102014004633 | 10/2015 | |

(Continued)

OTHER PUBLICATIONS

Herzog, English machine translation of DE102014004633, Jan. 10, 2015 (Year: 2015).*

(Continued)

*Primary Examiner* — Matthew J Daniels
*Assistant Examiner* — Paul Spiel
(74) *Attorney, Agent, or Firm* — Massina Pat & TM Law PLLC

(57) ABSTRACT

An apparatus for fabricating a three-dimensional object from a representation of the object stored in memory. The apparatus includes a drum supported for rotation. A build platform is supported for linear movement within the drum from a first position adjacent a first end of the drum to a second position within the drum. The build platform is rotationally fixed relative to the drum such that the build platform rotates with the drum. A powder feed hopper is fixed at a position above a first portion of the build platform. At least one directed energy source is positioned above the build platform and is configured to apply directed energy to a majority of the remaining portion of the build platform excluding the first portion.

20 Claims, 10 Drawing Sheets

(51) Int. Cl.
   *B23K 26/34*   (2014.01)
   *B23K 26/354*  (2014.01)
   *B22F 10/10*   (2021.01)

(56) References Cited

U.S. PATENT DOCUMENTS

| | | | |
|---|---|---|---|
| 5,733,497 A | | 3/1998 | Mcalea et al. |
| 7,828,022 B2 | | 11/2010 | Davidson et al. |
| 8,827,684 B1 | | 9/2014 | Schumacher et al. |
| 8,905,742 B2 | | 12/2014 | Knighton |
| 9,586,290 B2 | | 3/2017 | Buller et al. |
| 9,688,026 B2 | | 6/2017 | Ho et al. |
| 10,071,443 B2 | * | 9/2018 | Eriksson ............... B29C 64/153 |
| 10,500,832 B2 | * | 12/2019 | Bogdan, Jr. ............ B22F 10/20 |
| 10,710,159 B2 | * | 7/2020 | Corsmeier ............ B29C 64/153 |
| 11,007,713 B2 | * | 5/2021 | Spicer ................... B33Y 40/00 |
| 2003/0205851 A1 | | 11/2003 | Laschuetzka et al. |
| 2004/0265413 A1 | | 12/2004 | Russel et al. |
| 2005/0006047 A1 | * | 1/2005 | Wang ........................ B22C 9/10 |
| | | | 164/516 |
| 2006/0108712 A1 | | 5/2006 | Mattes |
| 2010/0264302 A1 | * | 10/2010 | Philippi ................ B29C 64/268 |
| | | | 250/252.1 |
| 2013/0264750 A1 | * | 10/2013 | Hofacker ................ B22F 12/00 |
| | | | 264/497 |
| 2014/0191439 A1 | | 7/2014 | Davis |
| 2015/0064048 A1 | * | 3/2015 | Bessac ................... B33Y 30/00 |
| | | | 419/29 |
| 2015/0246485 A1 | * | 9/2015 | Guenster ............... B29C 64/165 |
| | | | 264/511 |
| 2015/0306819 A1 | * | 10/2015 | Ljungblad ............. B23P 15/006 |
| | | | 419/55 |
| 2016/0031159 A1 | | 2/2016 | Church et al. |
| 2016/0136759 A1 | | 5/2016 | Broda |
| 2016/0167303 A1 | | 6/2016 | Hellestam |
| 2016/0200052 A1 | | 7/2016 | Moore et al. |
| 2017/0008082 A1 | | 1/2017 | Chen |
| 2017/0120334 A1 | | 5/2017 | Demuth et al. |
| 2017/0190112 A1 | | 7/2017 | Thorson et al. |
| 2017/0252806 A1 | * | 9/2017 | Wienberg ............. B22F 3/1055 |
| 2017/0348905 A1 | | 12/2017 | Fey |
| 2019/0160749 A1 | * | 5/2019 | Hellestam ............. B29C 64/236 |
| 2020/0398341 A1 | * | 12/2020 | Hellestam ........... B23K 26/342 |

FOREIGN PATENT DOCUMENTS

| | | |
|---|---|---|
| WO | WO2014092651 | 6/2014 |
| WO | WO2014195068 | 12/2014 |
| WO | WO2017114852 | 7/2017 |

OTHER PUBLICATIONS

Deiss, English machine translation of DE102013210242, Apr. 12, 2014 (Year: 2014).*
PCT International Search Report and Written Opinion dated Jul. 5, 2019 from corresponding PCT Appln. No. PCT/US19/27635.
A True Rotary 3D printer? https://www.element14.com/community/thread/25031/1/a-true-rotary-3d-printer?displayFullThread=true.

* cited by examiner

SYSTEM AND METHOD FOR ROTATIONAL 3D PRINTING

FIELD

The disclosure herein relates to systems and methods for 3D printing, in particular for continuous rotary 3D printing.

BACKGROUND

Three-dimensional (3D) printed parts result in a physical object being fabricated from a 3D digital image by laying down consecutive thin layers of material.

Typically these 3D printed parts can be made by a variety of means, such as selective laser sintering, selective laser melting or selective electron beam melting, which operate by having a powder bed onto which an energy beam of light or heat is projected to melt the top layer of the powder bed so that it welds onto a substrate or a substratum. This melting process is repeated to add additional layers to the substratum to incrementally build up the part until completely fabricated.

For each additional layer, powder is deposited onto the powder bed and then must be smoothed prior to application of energy for the melting/sintering of the next layer. In this regard, the powder beds typically have a rectangular configuration and require the powder applicator and a smoothing roller or the like to be linearly moved across the bed, often requiring a forward and reverse path to accomplish both depositing and smoothing. While some systems have accomplished depositing and smoothing in a single pass, such systems generally require a larger footprint to accomplish such. Whether in a single pass or a reciprocal pass, application of the energy, and thereby formation of the next layer, must be paused during such depositing and smoothing steps.

Since many 3D printed parts are comprised of thousands of layers, such delays between formation of each layer result in a time consuming process which has limited the full scale application of 3D printing.

SUMMARY

In at least one aspect, the present disclosure provides an apparatus for fabricating a three-dimensional object from a representation of the object stored in memory. The apparatus includes a drum supported for rotation. A build platform is supported for linear movement within the drum from a first position adjacent a first end of the drum to a second position within the drum. The build platform is rotationally fixed relative to the drum such that the build platform rotates with the drum. A powder feed hopper is fixed at a position above a first portion of the build platform. At least one directed energy source is positioned above the build platform and is configured to apply directed energy to a majority of the remaining portion of the build platform excluding the first portion.

BRIEF DESCRIPTION OF THE DRAWINGS

The accompanying drawings, which are incorporated herein and constitute part of this specification, illustrate the presently preferred embodiments of the disclosure, and, together with the general description given above and the detailed description given below, serve to explain the features of the disclosure. In the drawings.

DETAILED DESCRIPTION

Figure 1:
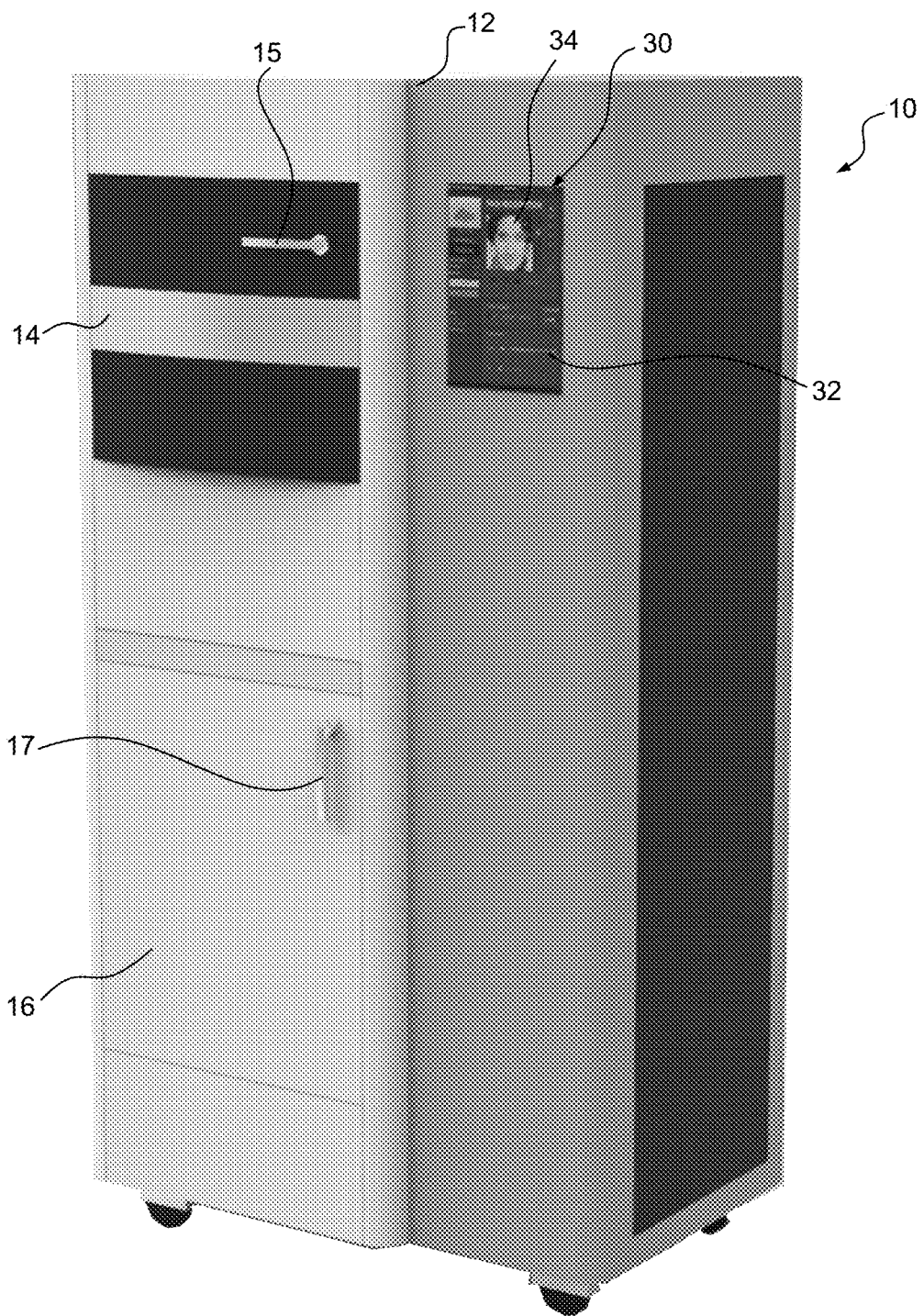
FIG. 1 is a perspective view of a 3D printing system in accordance with an embodiment of the disclosure.

In the drawings, like numerals indicate like elements throughout. Certain terminology is used herein for convenience only and is not to be taken as a limitation on the present disclosure. The following describes preferred embodiments of the present disclosure. However, it should be understood, based on this disclosure, that the disclosure is not limited by the preferred embodiments described herein.

Referring to FIGS. 1-4, a 3D printing system 10 in accordance with an embodiment of the disclosure will be described generally. In the illustrated embodiment, the printing system 10 includes a housing 12 which encloses a drum assembly 50 and a build assembly 80 and may optionally enclose gas supply tanks 40 and powder supply containers 46. It is understood that the gas supply and/or powder supply may be external to the housing 12 and may be fed into the housing 12 via pipes, tubes or the like. The housing 12 is formed from various exterior panels secured to a support frame 20. Various doors, removable panels or the like may be provided to facilitate access to different areas within the housing 12. As illustrated in FIG. 1, a first door 14 provides access to the build assembly 80 while a second door 16 provides access to the drum assembly 50, the doors 14, 16 having respective handles 15, 17. While two doors are shown, it is understood that more or fewer doors may be utilized.

It is noted that due to the rotary motion of the drum assembly 50 and the build platform 70 while the build assembly 80 remains stationary, generally within the radius of the drum 54, the housing 12 has a relatively small footprint. More specifically, because it is not necessary to move the powder applicator and/or smoothing roller clear of the build platform, such additional space within the housing which is usually required for X-Y printing systems is not required.

Referring to FIG. 1, a control panel 30 is supported on the housing 12 and is in communication with a control processor (not shown) within the housing 12. The control panel 30 includes an input/output (I/O) interface 32, for example, in the form of a touch screen, however other I/O devices may be utilized. A user can utilized the I/O interface 32 to enter control commands, data and the like to the control processor and receive information indicative of the operation of the system 10. In the illustrated embodiment, the control panel 30 includes a face recognition sensor 34, for example as described in US Appln. Pub. No. 2017/0228585, the contents of which are incorporated herein by reference. The face recognition sensor 34 is configured to regulate access to the control processor or physical access within the housing 12. The face recognition system 34 may also be utilized to maintain a log of users accessing the system 10 and each individual's usage. While a face recognition system is described, the system 10 may incorporate additional or alternative access control, for example, other biometric sensors, control card sensors or password sensors. Alternatively, if utilized in a secure environment, the system 10 may not have any access control.

Figure 2:
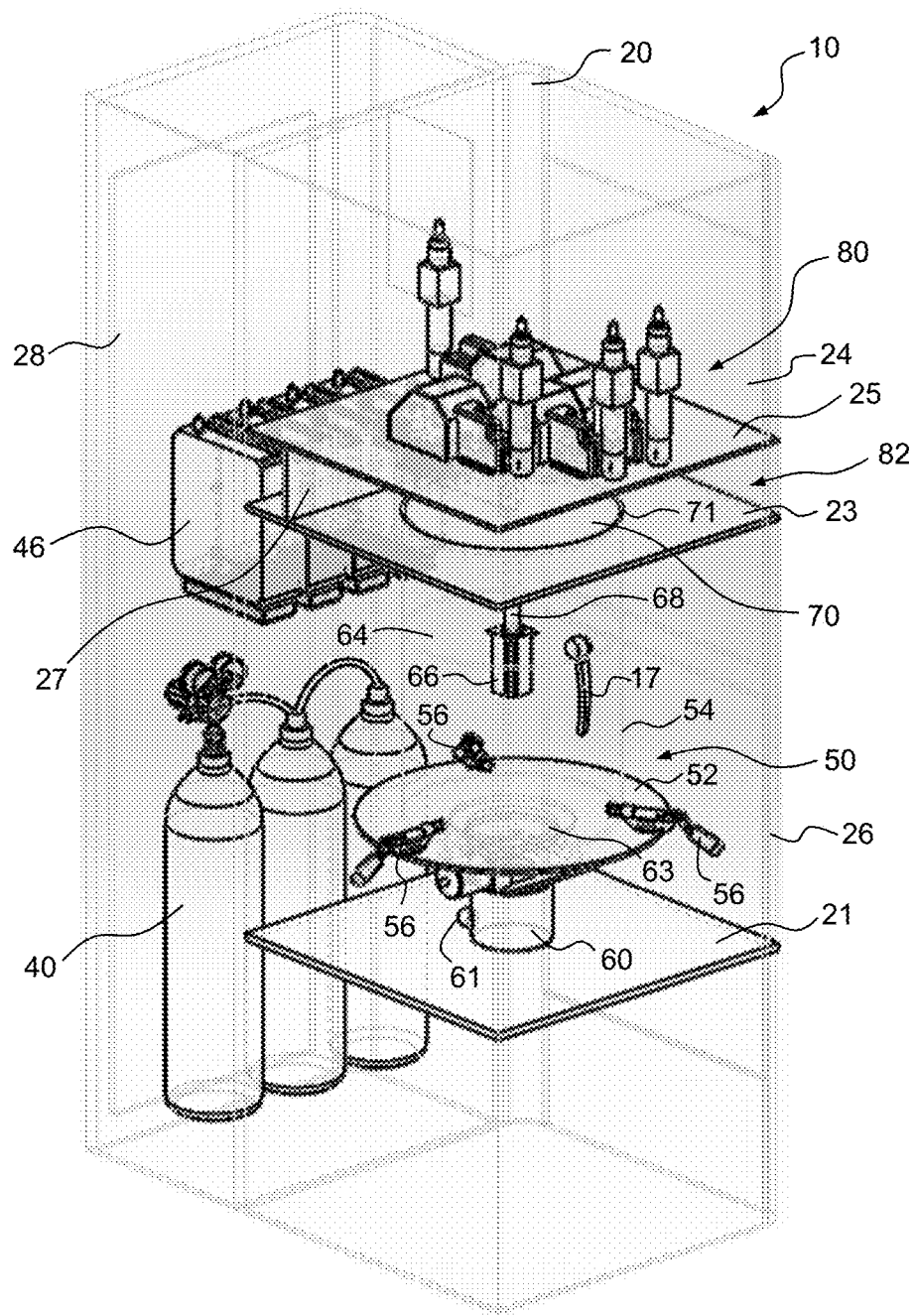
FIG. 2 is a perspective view of the 3D printing system with the housing panels removed and the frame structure shown in phantom.
Figure 3:
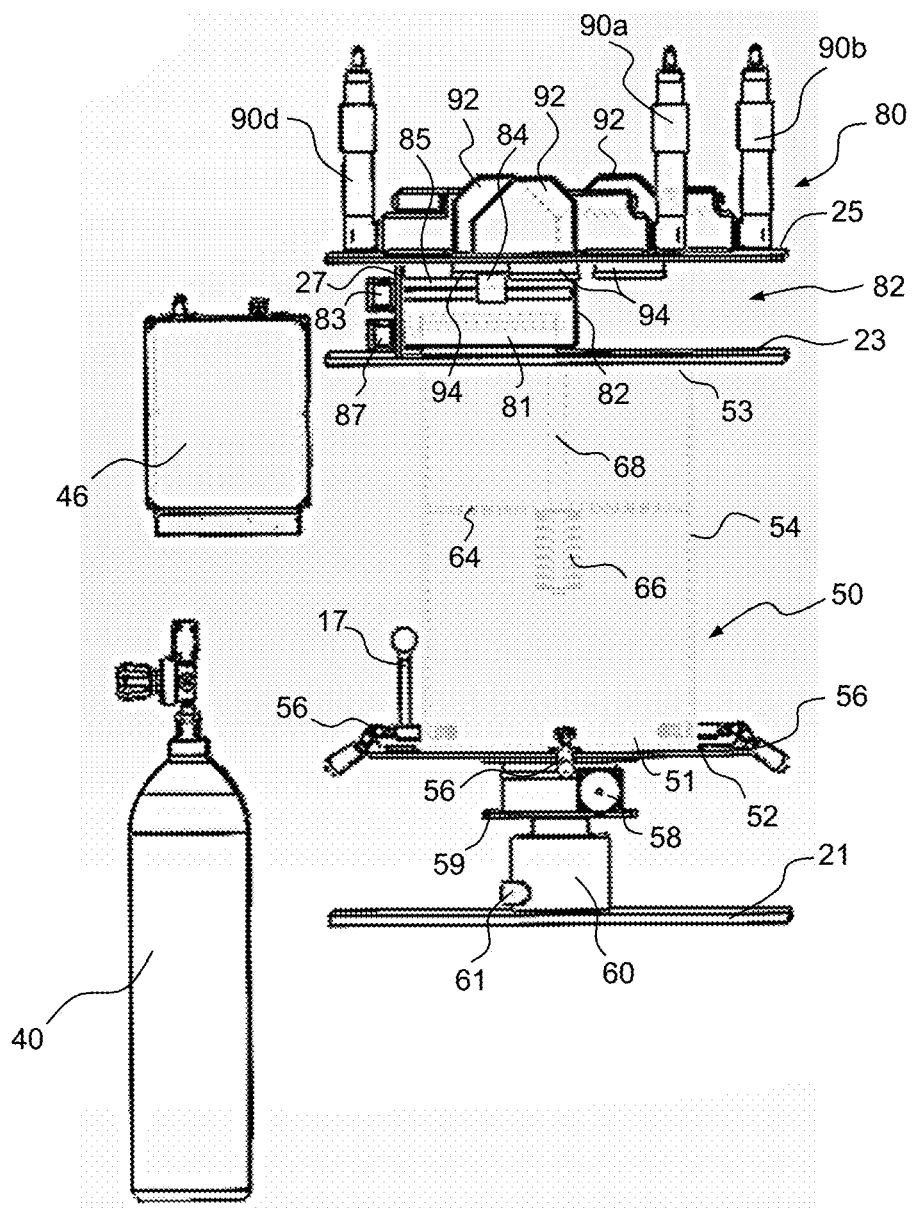
FIG. 3 is a left side elevation view of the 3D printing system with the housing and frame structure removed.
Figure 4:
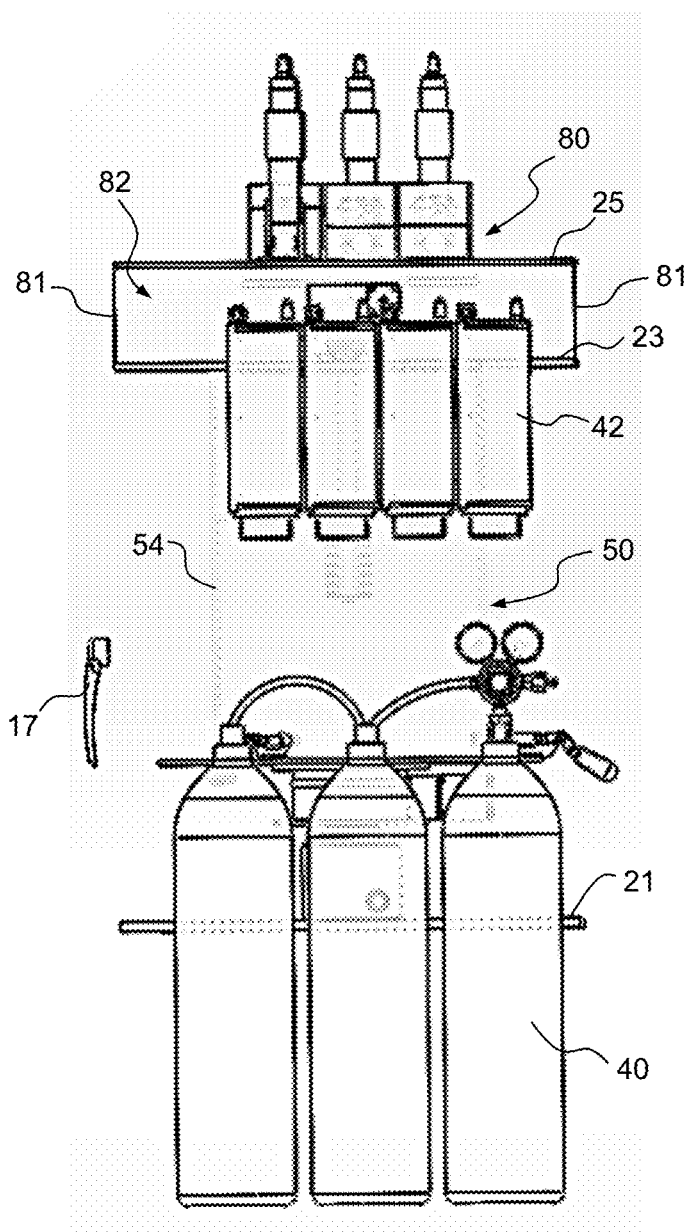
FIG. 4 is a rear elevation view of the 3D printing system with the housing and frame structure removed.
Figure 5:
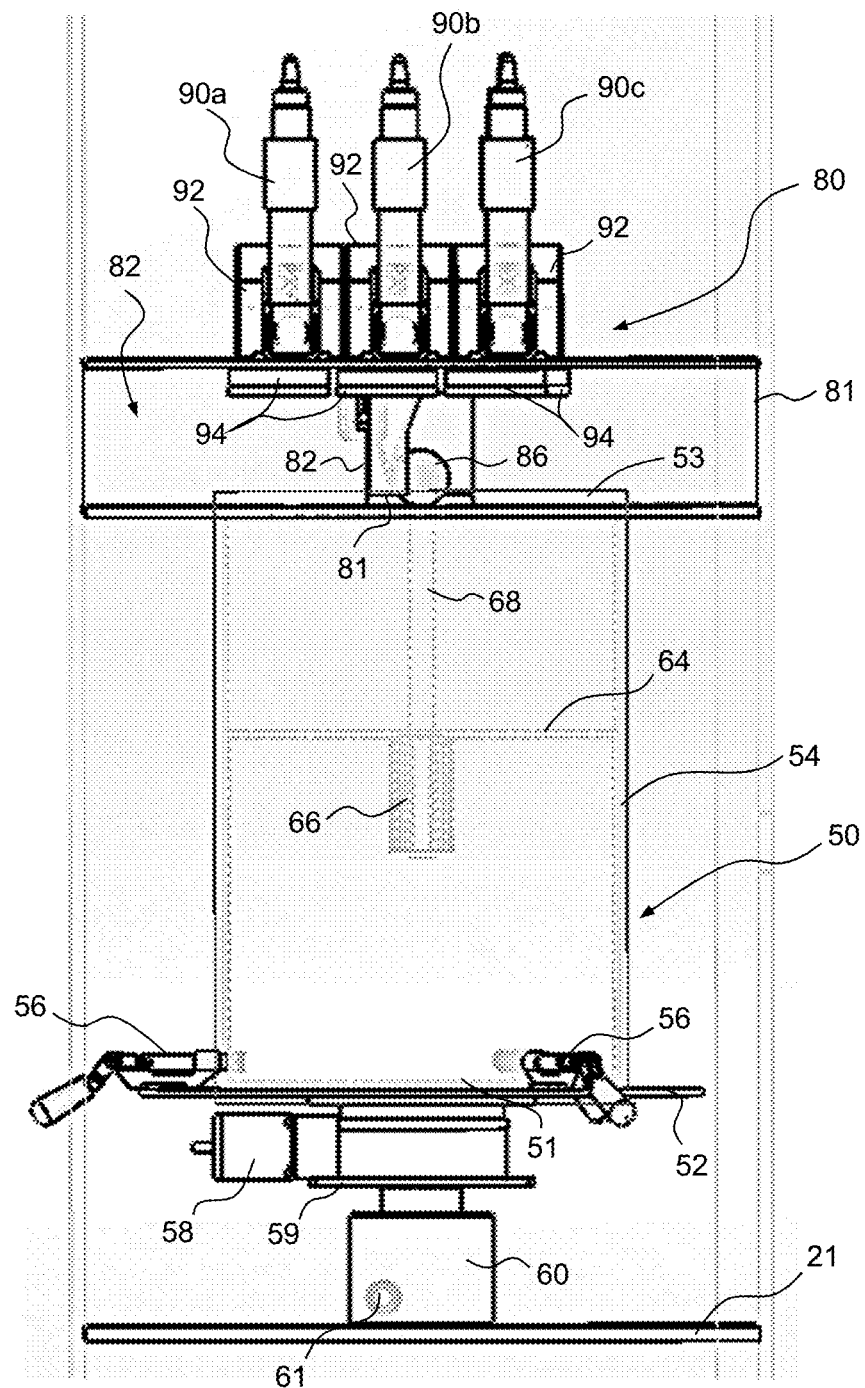
FIG. 5 is a front elevation view of a portion of the 3D printing system with the housing panels removed and the frame structure shown in phantom.
Figure 6:
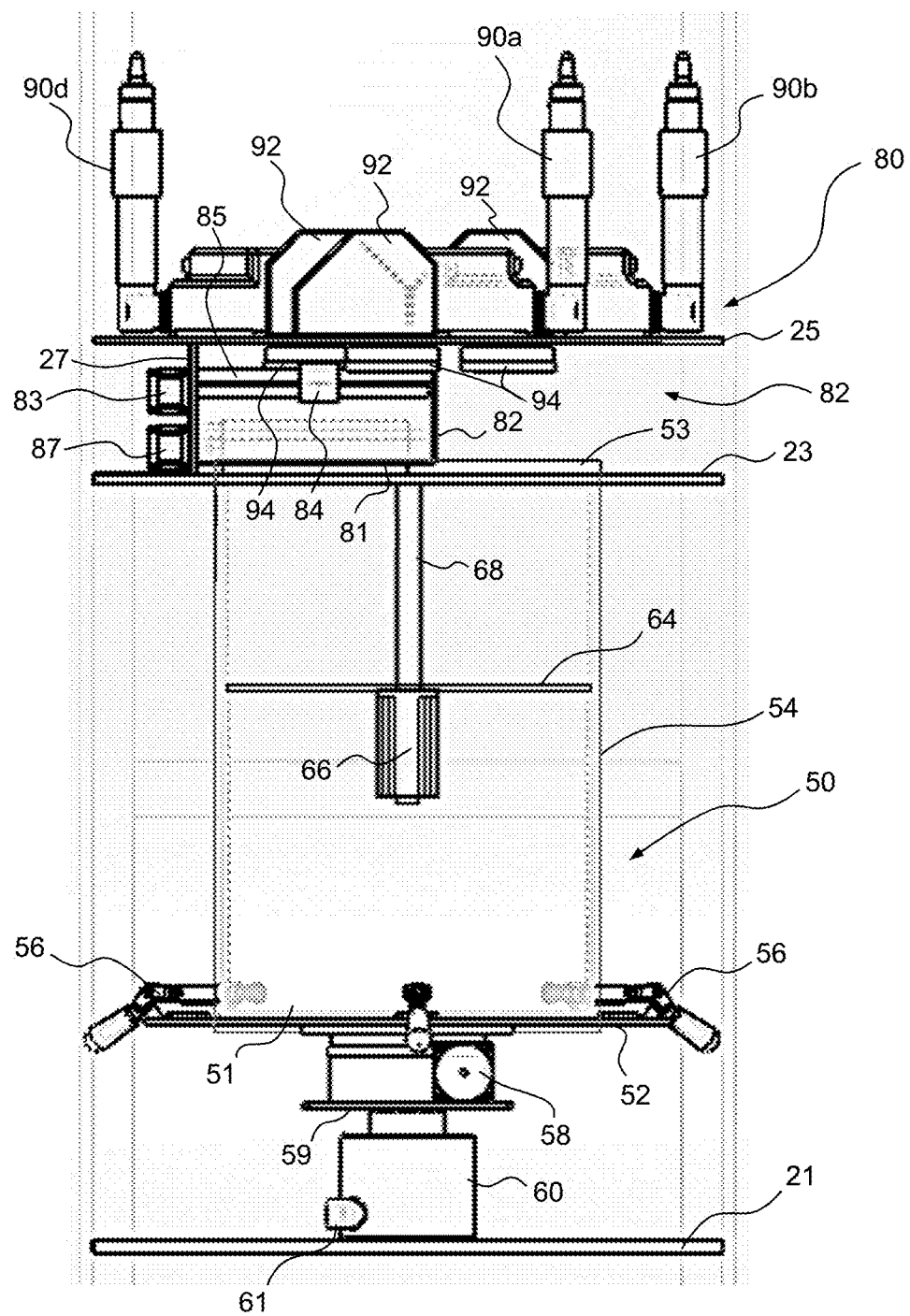
FIG. 6 is a left side elevation view of a portion of the 3D printing system with the housing removed and the frame structure shown in phantom.
Figure 7:
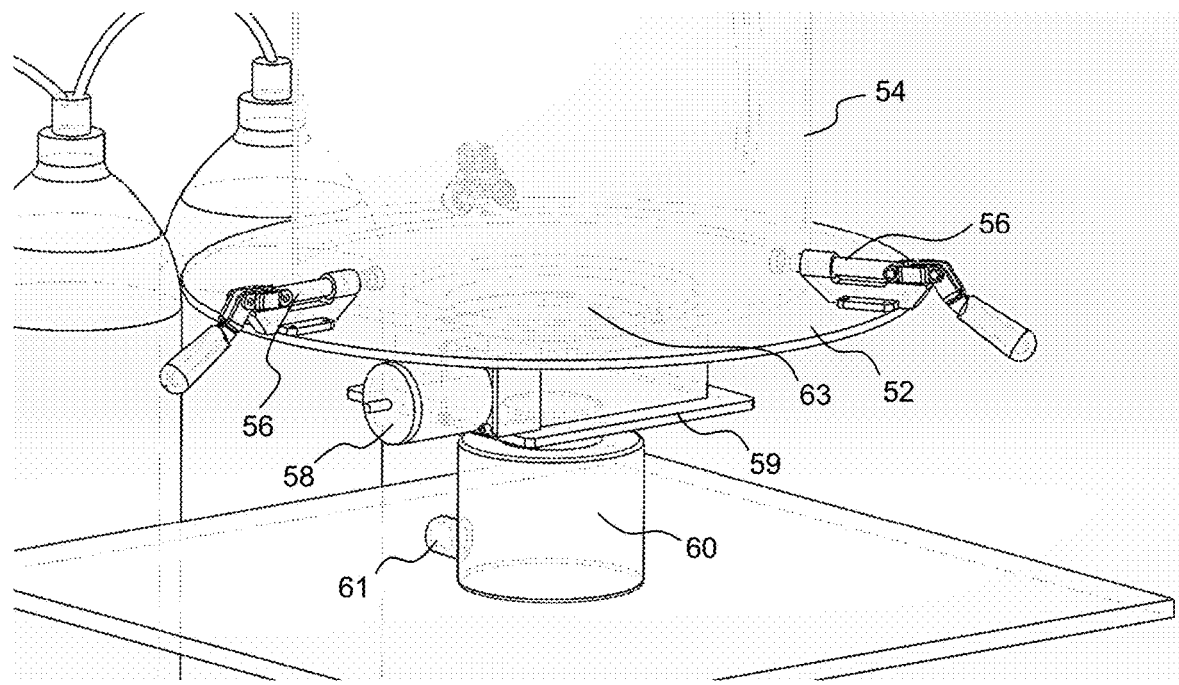
FIG. 7 is a top perspective view of the drum rotation assembly.
Figure 8:
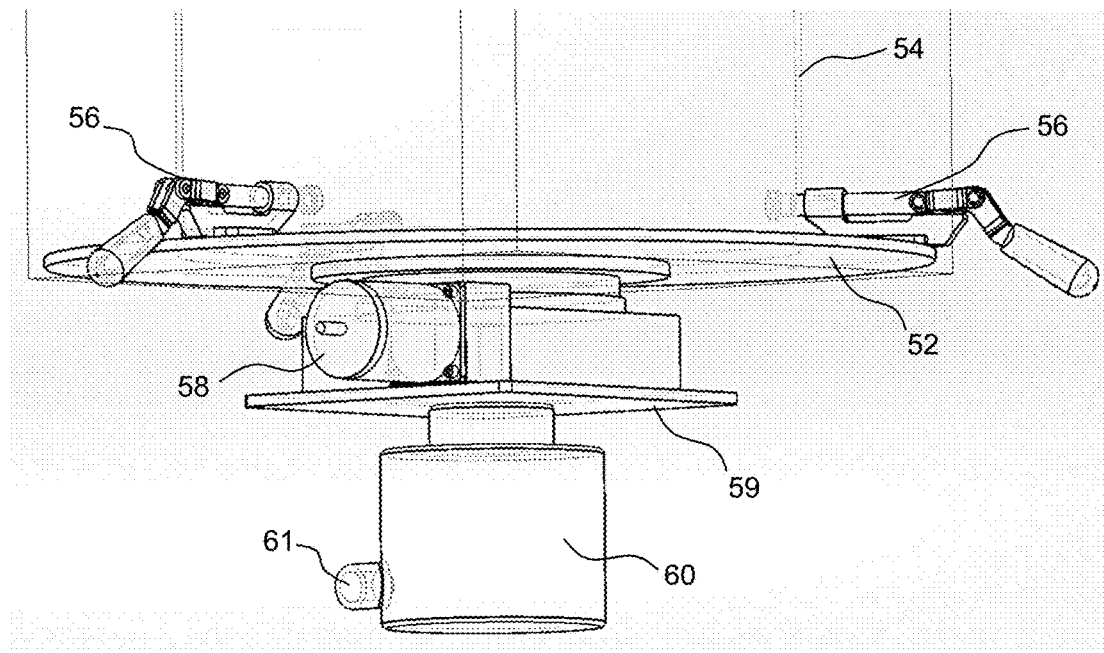
FIG. 8 is a bottom perspective view of the drum rotation assembly.

Referring to FIGS. 2-4, within the housing 12, a lower support panel 21, an intermediate panel 23 and an upper support panel 25 are supported by the frame 20. The lower support panel 21 is configured to support the drum assembly 50. The upper support panel 25 is configured to support portions of the build assembly 80. The intermediate panel 23 is positioned between the lower and upper panels 21, 25 with a build chamber 82 defined therebetween the intermediate panel 23 and the upper support panel 25. A vertical support panel 27 extends between the panels 23, 25 to support portions of the build assembly 80 within the build chamber 82. A sealing wall 81, which is illustrated in FIG. 4 but is omitted in FIGS. 2 and 3, extends between the panels 23, 25 on the remaining three sides and in sealing engagement with the panels 23, 25, 27 such that the build chamber 82 is air-tight. The sealing wall 81, or a portion thereof, may be removable to facilitate access within the build chamber 82 if necessary.

Turning to FIGS. 5-12, the drum assembly 50 and the build assembly 80 will be described in more detail. The drum assembly 50 generally includes a generally cylindrical drum 54 with a through passage extending from a lower end 51 to an upper end 53. The lower end 51 of drum 54 is supported on a rotatable platform 52 in sealing engagement therewith. Clamps 56 or the like are utilized to releasably secure the drum 54 to the platform 52. The upper end 53 of the drum 54 extends to the build chamber 82 through an opening 71 in the intermediate panel 23 (see FIG. 2). The upper end 53 is in sealing engagement with the intermediate panel 23 while still being rotatable relative thereto.

A drum motor 58 is supported below the rotatable platform 52 in a fixed position relative to the lower support platform 21. The drum motor 58 is configured to rotate the rotatable platform 52 and thereby the drum 54. Bearings or the like (not shown), may be provided about the rotatable platform 52 and/or the drum 54 to facilitate smooth rotation thereof. The drum motor 58 is in communication with the control processor which controls the drum motor 58 to rotate the rotatable platform 52, and thereby the drum 54 at a desired speed.

In the illustrated embodiment, the drum motor 58 is supported on a fixed plate 59 which is fixed relative to the lower support panel 21. In the illustrated embodiment, a vacuum unit 60 is positioned between the fixed plate 59 and the lower support panel 21. The vacuum 60 has an outlet port 61 which may be vented outside of the housing 12. The vacuum 60 has an intake 63 which extends through the rotatable platform 52 such that the vacuum force may be applied into the drum 54 and into the build chamber 82 to remove heat and smoke generated during the printing process.

A support structure 64 is supported within the drum 54 and is configured to rigidly support a screw drive 66 relative to the drum 54. The support structure 64 may have various configurations, for example, a plate, a spoke, cross straps, a cantilevered arm, or the like which fixedly supports the screw drive 66 relative to the drum 54. Preferably the support structure 64 has some porosity to allow the vacuum force to pass thereby. A screw shaft 68 extends from the screw drive 66 to the build platform 70 (see FIG. 9). The screw shaft 68 is fixed against rotation relative to the both the screw drive 66 and the build platform 70. Since the screw drive 66 is fixed relative to the drum 54, rotation of the drum 54 by the drum motor 58 will cause a corresponding rotation of the build platform 70, as indicated by the arrows A in FIGS. 9 and 10.

Figure 9:
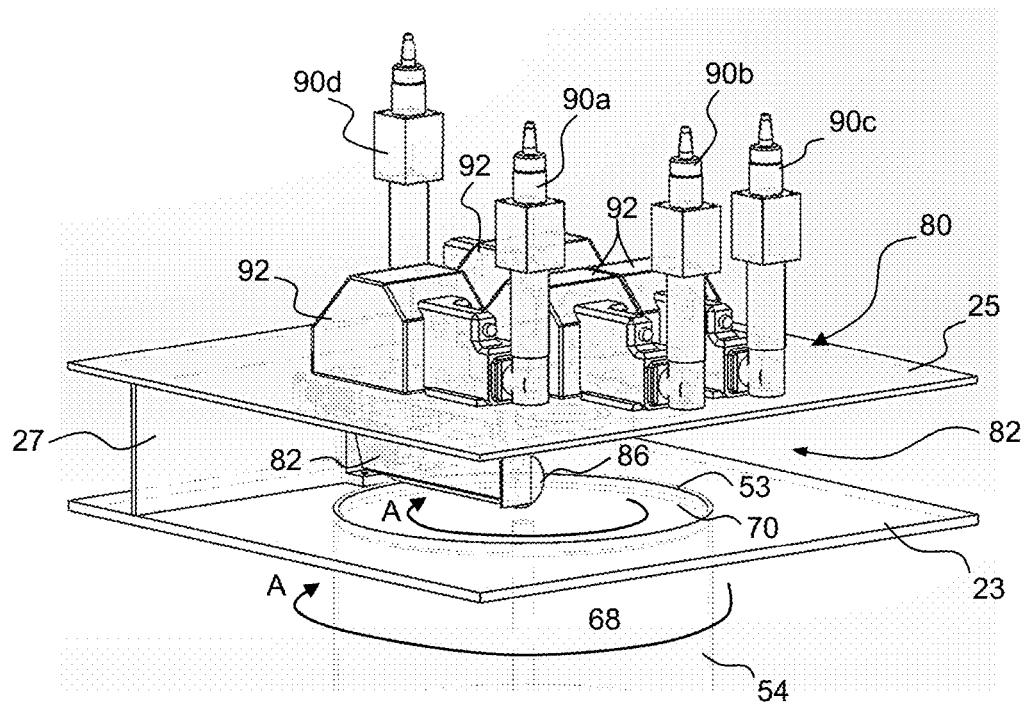
FIG. 9 is a top perspective view of the build assembly.
Figure 10:
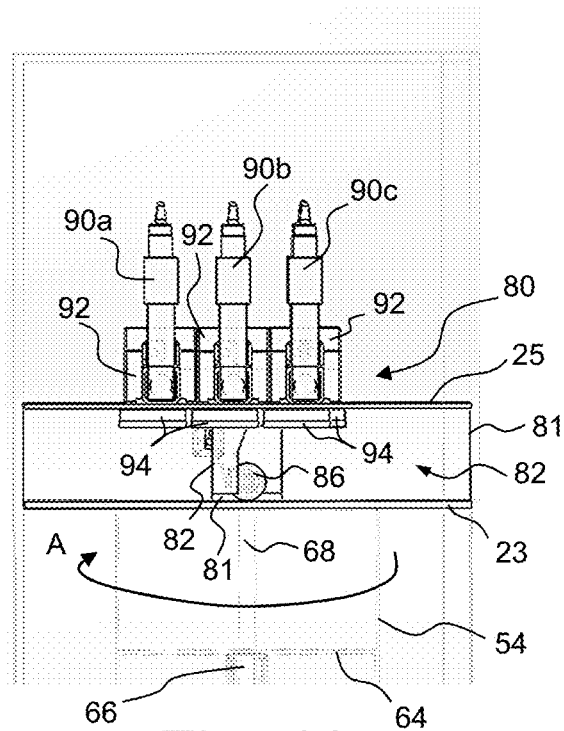
FIG. 10 is a front elevation view of the build assembly.

The build platform 70 starts in an initial position just at or slightly above the upper end 53 of the drum 54 as shown in FIG. 9. The inner dimeter of the drum 54 and the outer diameter of the build platform 70 are maintained to close tolerances such that only a minimal gap 72 extends therebetween (see FIG. 12). To facilitate the vacuum force reaching the build chamber 82, the build platform 70 is preferably manufactured from a gas permeable material, for example, a gas permeable ceramic such as an ultra filtration ceramic membrane, which allows the heat and smoke to be vacuumed from the build chamber 82 but does not allow the powder to pass through.

Since the build assembly 80 is fixed in location, as each successive layer of the 3D printed objects is sintered or melted, it is necessary to move the build platform down by such layer thickness. Such downward movement is accomplished by the screw drive 66. As the internal screw of the screw drive is rotated, as indicated by arrow B in FIG. 12, the internal screw engages the screw shaft 68, causing the shaft 68 to move linearly as indicated by arrow C. The screw drive 66 does not rotate the screw shaft, but instead, the engagement of the respective threads and the rotationally fixed configuration of the screw shaft 68, causes the shaft to move linearly. Rotation of the screw drive 66 is independent of rotation of the drum motor 58 which allows precise lowering in response to layer thickness regardless of the rotation speed of the drum 54 and thereby the build platform 70. With this configuration, the completed object(s) will be lowered into the drum 54. Upon completion, the drum 54 may be released via the clamps 56 or the like and the drum 54 removed from the housing to remove the completed object(s). A new, empty drum may be clamped on to the rotating platform 52 and a new process started. Alternatively, it is contemplated that a system may hold more than one drum and the drums may be selectively rotated into position in alignment with the build assembly 80.

The build assembly 80 includes a hopper 79 with a lower opening 81 configured to continuously deliver powder to the build platform 70. The hopper 79 is supported by the vertical support panel 27. In the illustrated embodiment, a slide mechanism 84 is supported along a rail 85 on the side of the hopper 79. The slide mechanism 84 connects to an end of a delivery hose (not shown) extending from the powder containers 46. A linear actuator 83 associated with the slide mechanism 84 moves the slide mechanism 84 back and forth along the rail 85 such that the delivery hose end moves back and forth along the hopper 79, evenly distributing the powder. The powder may be any form of small particles typically used in laser or electron beam 3D printing. For example, the powder may be of plastic, metal, ceramic, glass or composites thereof. As non-limiting examples, the powder may include polymers such as nylon (neat, glass-filled, or with other fillers) or polystyrene, or metals including steel, titanium, alloy mixtures, for example, but not limited to, 17-4 and 15-5 stainless steel, maraging steel, cobalt chromium, inconel 625 and 718, aluminum AlSi10Mg, and titanium Ti6Al4V.

After the powder is delivered to the rotating build platform 70, it is smoothed by a roller 86 on the trailing side of the hopper 79. The roller 86 is supported by the vertical support panel 27 and is rotated by an actuator 87. The roller 86 is rotated such that its lower edge moves toward the hopper 79, i.e. toward the oncoming powder, thereby smoothing the powder. The smoothed powder is then ready for selective fusing via melting or sintering utilizing a targeted energy source.

Figure 11:
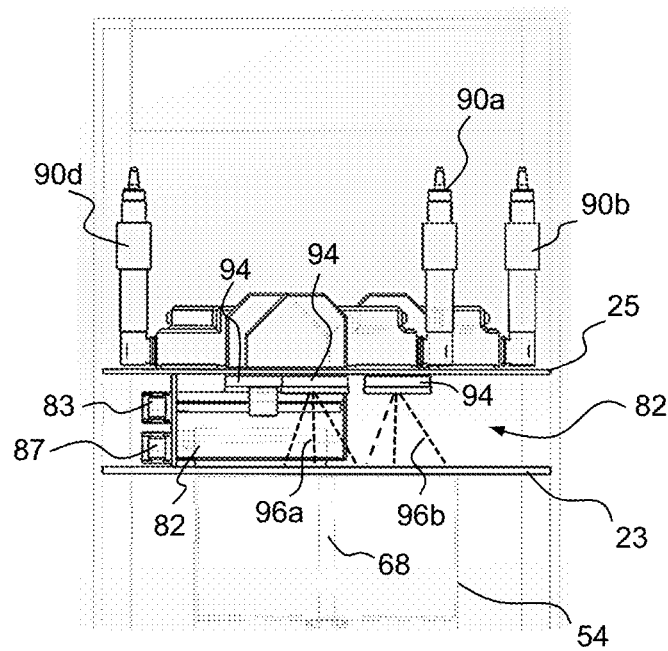
FIG. 11 is a left side elevation view of the build assembly.
Figure 12:
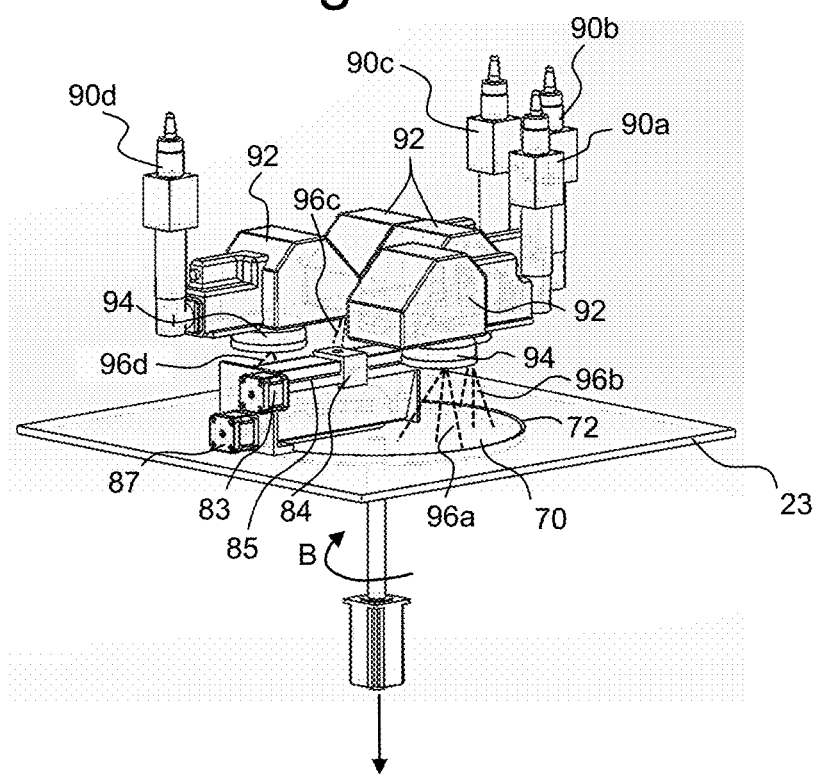
FIG. 12 is a top perspective view of the build assembly and vertical control assembly.

In the illustrated embodiment, the targeted energy source is a plurality of lasers 90a-90d. Each laser 90a-90d has an associated beam deflection system 92, e.g. Galvano scanner, which is used to focus the laser beam 96a-96d out the respective beam window 94 to the desired position on the build platform 70 in order to scan each layer, as illustrated in FIGS. 11-12. The lasers 90a-90d may have various configurations, for example, Nd:YAG and Yb-fiber optic lasers, CO lasers and He—Cd lasers. Because the hopper 79 and roller 86 provide continuously smooth powder and the target areas of the beams 96a-96d are the remainder of the build platform 70 other than the fixed position hopper 79 and roller 86, the layers may be formed continuously along the rotating build platform 70 without any need to pause the fusing process. The number and position of the lasers 90a-90d may be selected to provide desired fusing at a desired rotation speed of the build platform 70. It is also noted that the beam windows 94 are relatively close to the build platform 70, the beams 96a-96d will have less distance to travel to accomplish fusing of a given layer, affording greater rotation speeds. Additionally, the beams 96a-96d contact the powder at less of an inclination resulting in less angled formation and accompanying roughness.

Such laser sintering or melting typically requires a tightly controlled atmosphere of inert gas, for example, argon or nitrogen at oxygen levels below 500 parts per million. The sealed build chamber 82 allows for such a controlled atmosphere with the required gas controllably supplied by the gas tanks 40.

While the illustrated embodiment utilizes lasers, other energy sources may be utilized, for example, electron beam guns. In such a system, since electrons interact with the atmosphere, it is necessary to have a vacuum chamber which may be maintained in the sealed build chamber using a controlled helium inflow from the gas tanks 40. In all other aspects, the system would operate in the same manner.

Figure 13:
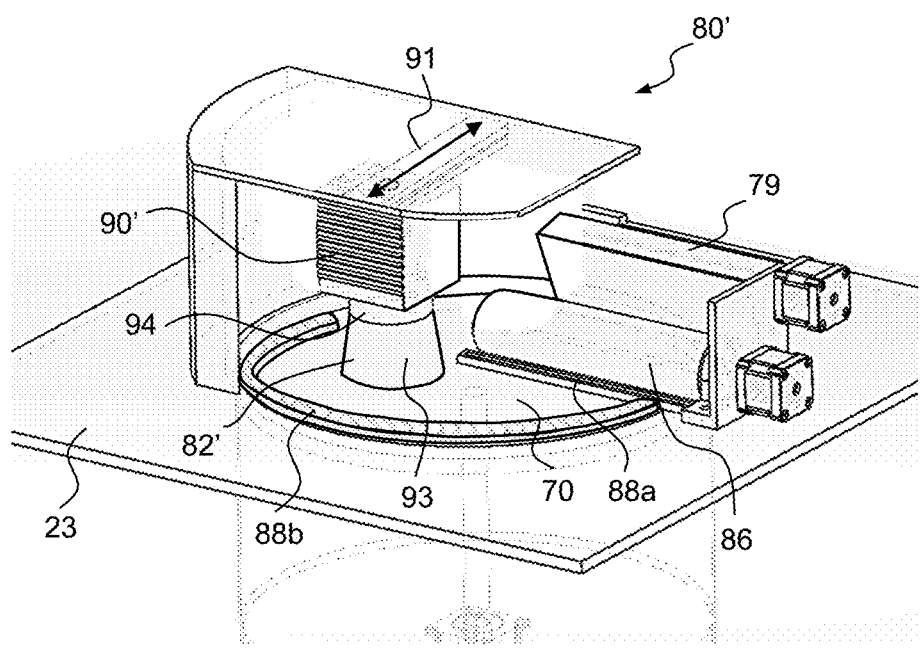
FIG. 13 is a top perspective view of an alternative build assembly.

Referring to FIG. 13, a system incorporating an alternative build assembly 80' is illustrated. The build assembly 80' is similar to that described above and only the differences will be described herein. It is noted that any of the features described in the present embodiment may be separately incorporated into the previous embodiment and vice versa. In the present embodiment, the build assembly 80' includes a pair of heating elements 88a and 88b. Since in some applications it may be beneficial to heat the powder before fusing, the heating element 88a may be a heating bar positioned downstream from the roller 86 to heat the smoothed powder. Additionally, or alternatively, the heating element 88b may be a circular bar extending about a portion or the entirety of the build platform 70 to heat the powder over a larger area. The heating elements 88a, 88b may have various configurations, for example, an electronic heating bar, infrared heating bar, induction heating bar or the like. In an alternative embodiment, a portion of the lasers 90a and 90b may be utilized to preheat the material and the remaining lasers 90c and 90d may be utilized to fuse the powder.

Additionally, the build assembly 80' includes a single laser 90' which is self-contained. The laser 90' is moveable along a rail 91 supported by a portion of the support frame. In the illustrated embodiment, the rail 91 has a linear configuration and the laser 90' moves radially inward and outward as indicated by the arrow in FIG. 13. The rail may have other configurations, for example, an arcuate path or a structure that allows the laser 90' to be moved in multiple coordinate planes. The moveable laser 90' is not limited to a rail system, but may be otherwise moved, for example, utilizing a robotic arm (not shown). Additionally, the laser 90' includes an extended cone 93, for example, manufactured from glass, which extends from the laser beam window 94 to just above the build platform 70. The extended cone 93 defines a laser specific gas chamber 82' which would contain the inert gas necessary for the laser sintering or melting. The extended cone 93 would eliminate the need for a sealed build chamber.

These and other advantages of the present disclosure will be apparent to those skilled in the art from the foregoing specification. Accordingly, it will be recognized by those skilled in the art that changes or modifications may be made to the above-described embodiments without departing from the broad inventive concepts of the disclosure. It should therefore be understood that this disclosure is not limited to the particular embodiments described herein, but is intended to include all changes and modifications that are within the scope and spirit of the disclosure as defined in the claims.

What is claimed is:

1. An apparatus for fabricating a three-dimensional object as a series of printed layers from a representation of the object stored in memory, the apparatus comprising:
   a drum supported for rotation about a central axis;
   a build platform coaxial with and supported for linear movement within the drum from a first position adjacent a first end of the drum to a second position within the drum, the build platform defining a circumference and rotationally fixed relative to the drum such that the build platform rotates with the drum;
   a powder feed hopper at a fixed position above a first portion of the build platform configured to provide a continuous printing layer of powder wherein the powder feed hopper extends radially from the build platform circumference inwardly such that the central axis passes through a portion of the powder feed hopper; and
   at least one directed energy source is positioned above the build platform, the at least one directed energy source is configured to apply directed energy to a majority of the remaining portion of the build platform.

2. The apparatus according to claim 1 including a plurality of directed energy sources with each of the directed energy sources at a fixed location and configured to apply directed energy to a portion of the build platform excluding the first portion.

3. The apparatus according to claim 1 wherein the at least one directed energy source is mounted for movement relative to the build platform such that the at least one directed energy source may be positioned above a majority of the build platform.

4. The apparatus according to claim 3 wherein the at least one directed energy source is mounted for movement along a rail.

5. The apparatus according to claim 3 wherein the at least one directed energy source is mounted for movement via a robotic arm.

6. The apparatus according to claim 1 wherein the at least one directed energy source is a laser.

7. The apparatus according to claim 1 wherein the at least one directed energy source is an electron beam gun.

8. The apparatus according to claim 1 wherein a screw drive is secured within the drum such that it rotates therewith and a screw shaft extends between the screw drive and the build platform, the screw shaft fixed against rotation relative to the screw drive.

9. The apparatus according to claim 1 wherein rotation of the screw drive causes linear motion of the build platform.

10. The apparatus according to claim 9 wherein a drum motor causes rotation of the drum and wherein the drum motor and the screw drive are independently operable.

11. The apparatus according to claim 1 wherein the build platform is manufactured from a gas permeable material which allows gases to pass therethrough but not powder supported on the build platform.

12. The apparatus according to claim 11 wherein the build platform is manufactured from an ultra filtration ceramic membrane.

13. The apparatus according to claim 11 wherein a vacuum force is applied within the drum and pulls smoke and heat through the build platform.

14. The apparatus according to claim 1 wherein the powder feed hopper and the at least one directed energy source are positioned within a build chamber.

15. The apparatus according to claim 14 wherein the build chamber is sealed to be air-tight.

16. The apparatus according to claim 14 wherein each of the at least one directed energy sources has an extended cone extending therefrom to a height slightly spaced from an initial location of the build platform, each extended cone defining a respective gas chamber.

17. The apparatus according to claim 1 wherein a slide mechanism is moveable along the powder feed hopper, the slide mechanism connected with a powder feed tube and configured to move the powder feed tube along the powder feed hopper to evenly distribute powder within the powder feed hopper.

18. The apparatus according to claim 1 wherein at least one heating element extends above at least a portion of the build platform.

19. The apparatus according to claim 18 wherein the at least one heating element is an electronic heating bar, an infrared heating bar or an induction heating bar.

20. The apparatus according to claim 1 wherein the drum is supported on and removable from a rotatable platform.

* * * * *